(12) United States Patent
Nejad et al.

(10) Patent No.: US 8,422,951 B2
(45) Date of Patent: Apr. 16, 2013

(54) WIRELESS COMMUNICATION SYSTEM AND METHOD FOR WIRELESS SIGNAL COMMUNICATION IN FLIGHT VEHICLES

(75) Inventors: Shah A. Nejad, Colorado Spring, CO (US); Rafael A. Ihly, Vail, AZ (US); Chad Wangsvick, Arvada, CO (US)

(73) Assignee: Raytheon Company, Waltham, MA (US)

( * ) Notice: Subject to any disclaimer, the term of this patent is extended or adjusted under 35 U.S.C. 154(b) by 707 days.

(21) Appl. No.: 12/695,322

(22) Filed: Jan. 28, 2010

(65) Prior Publication Data
US 2013/0065534 A1 Mar. 14, 2013

(51) Int. Cl.
*H04B 7/00* (2006.01)

(52) U.S. Cl.
USPC .......................... 455/41.2; 455/66.1; 455/431

(58) Field of Classification Search ................. 455/66.1, 455/90.3, 39, 41.2, 41.3, 431
See application file for complete search history.

(56) References Cited

U.S. PATENT DOCUMENTS

| 5,217,187 | A | * | 6/1993 | Criswell | 244/171.3 |
|---|---|---|---|---|---|
| 5,372,340 | A | * | 12/1994 | Ihara et al. | 244/172.5 |
| 5,799,902 | A | * | 9/1998 | Keith et al. | 244/55 |
| 6,108,523 | A | * | 8/2000 | Wright et al. | 455/66.1 |
| 6,382,563 | B1 | * | 5/2002 | Chiu | 244/120 |
| 7,036,773 | B2 | * | 5/2006 | Caldwell | 244/173.3 |
| 7,073,749 | B2 | * | 7/2006 | Krill et al. | 244/2 |
| 2003/0097951 | A1 | * | 5/2003 | Kaiserman et al. | 102/374 |
| 2005/0045771 | A1 | * | 3/2005 | Caldwell | 244/137.4 |
| 2008/0266173 | A1 | * | 10/2008 | Ailor | 342/357.07 |
| 2010/0311335 | A1 | * | 12/2010 | Durand et al. | 455/41.2 |

OTHER PUBLICATIONS

NASA, Guidance, Navigation and Control, HTTP://science.ksc.nasa.gov/shuttle/technology/sts-newsref/sts-gnnc.html, 1988, 21 pages.*
NASA, Solid Rocket Boosters, http://science.ksc.nasa.gov/shuttle/technology/sts-newsref/srb.html, 1988, 9 pages.*

* cited by examiner

*Primary Examiner* — Lewis West
(74) *Attorney, Agent, or Firm* — Schwegman Lundberg & Woessner, P.A.

(57) ABSTRACT

Systems and methods for wireless signal communication in flight vehicles are disclosed. In an embodiment, a system includes a first portion that generates a first wireless zone. A second portion is decoupleable from the first portion and generates a second wireless zone. The first wireless zone and the second wireless zone communicate flight-related information while the first portion and the second portion are coupled, and discontinue the communication subsequent to the separation of the first portion from the second structural portion. In another embodiment, a method includes establishing a first wireless zone in a first portion of a flight vehicle, and establishing a second wireless zone in a second decoupleable portion of the flight vehicle. Flight-related information is communicated between the first wireless zone and the second wireless zone while the first portion and the second portion are coupled, and communication is discontinued after decoupling.

20 Claims, 5 Drawing Sheets

WIRELESS COMMUNICATION SYSTEM AND METHOD FOR WIRELESS SIGNAL COMMUNICATION IN FLIGHT VEHICLES

STATEMENT OF GOVERNMENT INTEREST

This invention was made with United States Government support under Contract number H00006-04-C-0004 with the Missile Defense Agency. The United States Government has certain rights in this invention.

TECHNICAL FIELD

The various embodiments are generally directed to wireless signal communication in flight vehicles. More particularly, apparatuses, systems and methods for inter-stage signal communications in multistage flight vehicles are disclosed.

BACKGROUND

Contemporary flight vehicles generally include a variety of electronic and electromechanical systems, such as guidance systems, sensor systems or still other systems that are mutually interconnected to cooperatively interact during operation of the flight vehicle. Since the systems are generally physically separated within the structure of the flight vehicle, signal communications between the various interconnected systems generally rely upon signal transmission elements that extend between the various systems. For example, metallic conductors and even optical conductors may be routed throughout the flight vehicle structure to communicate signals between the various interconnected systems.

Multi-stage missiles are an example of a flight vehicle having a plurality of systems that are electrically interconnected. In general, multi-stage missiles include a number of aligned stages having separate propulsion and propellant systems that provide propulsive thrust for the multi-stage missile during a specified portion of a flight. Each stage may therefore be individually activated (either in a predetermined sequence, or in parallel) to accelerate the vehicle to an intended speed and altitude. When propellant within a stage is exhausted, an in-flight separation of the exhausted stage occurs, generally by means of pyrotechnic devices that can be detonated on command to sever portions of a structural coupling. Staging generally continues until a final stage is activated, depleted of propellant and separated from the flight vehicle.

During an in-flight separation of an exhausted missile stage from an adjacent and subsequently operative stage, the electrical interconnections between the exhausted stage and the subsequently operative stage are disconnected. Although the aforementioned pyrotechnic devices may be used to sever the electrical interconnections, more commonly, electrical inter-stage connectors are provided. Briefly, the inter-stage connectors are generally separable into mating portions that reliably provide an electrically continuous path through the connector when the mating portions are coupled, and electrically decouple when a specified separation force is applied to the connector. Although the aforementioned inter-stage connectors suitably allow stages to be electrically decoupled, they are generally expensive and undesirably add to the overall weight of the missile.

Many flight vehicles may further lack sufficient internal space to accommodate signal transmission elements, such as metallic and/or optical conductors. In particular, and with reference still to multi-stage missiles, the internal space within the missile stages is generally severely limited, so that transmission elements are routed in ducts that are positioned external to the stages. Accordingly, an aerodynamic and flight dynamics penalty is incurred by the externally positioned ducts.

Thus, there are general needs for systems and methods that avoid the use of inter-stage connectors and that also avoid externally positioned ducts to accommodate inter-stage signal transmission elements.

SUMMARY

Systems and methods for wireless signal communication in flight vehicles are generally described. In an aspect, a wireless communication system may include a first portion configured to generate a first wireless zone. A second portion may be configured to be structurally decoupled from the first portion and may be configured to generate a second wireless zone. The first wireless zone and the second wireless zone may be configured to communicate flight-related information between the first portion and the second portion while the first portion and the second portion are coupled, and to discontinue the communication of the flight-related information between the first portion and the second portion subsequent to the separation of the first portion from the second portion. In another aspect, a method may include establishing a first wireless zone in a first portion of a flight vehicle, and establishing a second wireless zone in a second portion of the flight vehicle. The first portion may be decoupled from the second portion of the flight vehicle. Flight-related information may be communicated between the first wireless zone and the second wireless zone while the first portion and the second portion of the flight vehicle are coupled, and the communication of the flight-related information between the first portion and the second portion of the flight vehicle may be discontinued subsequent to decoupling the first portion of the flight vehicle from the second portion of the flight vehicle.

DETAILED DESCRIPTION

The following description and the drawings sufficiently illustrate the various embodiments to enable those skilled in the art to practice them. Other embodiments may incorporate structural, logical, electrical, process, and other changes. Accordingly, the examples described herein merely typify possible variations. Individual components and functions may be optional, and the sequence of operations may also vary. Portions and features of the various embodiments may be included in, or substituted for, those of other embodiments. Therefore, the various embodiments as set forth in the claims are to be interpreted as encompassing all available equivalents of those claims.

Figure 1:
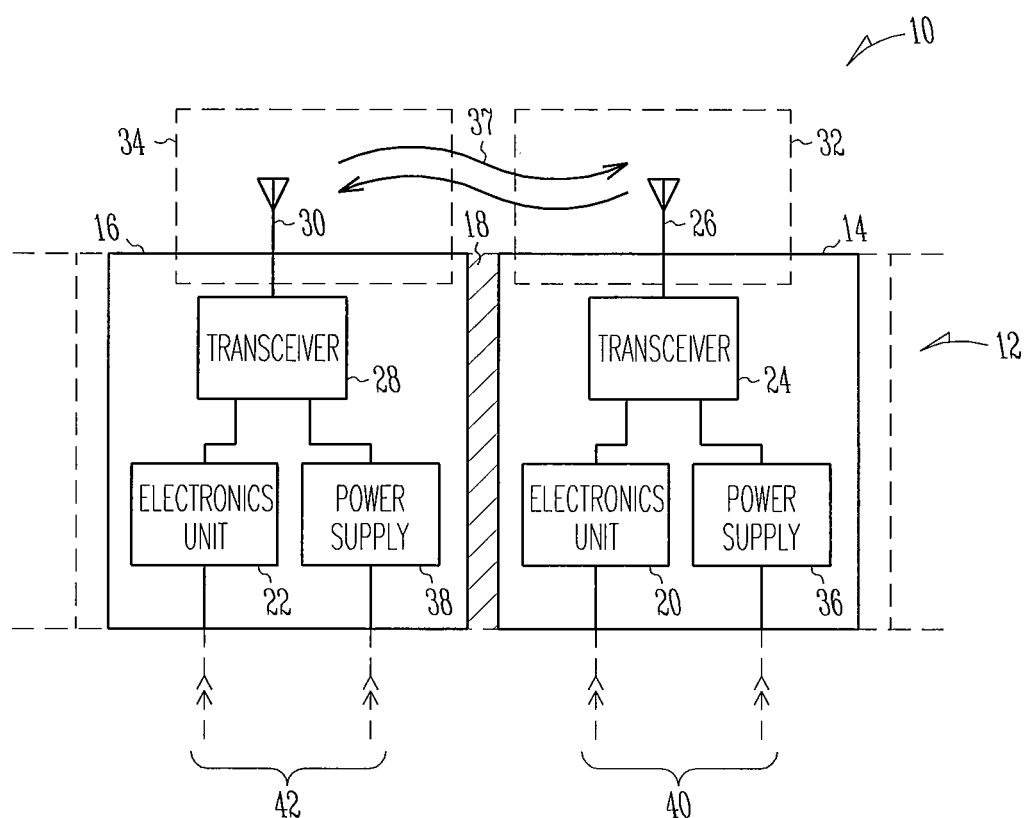
FIG. 1 is a partial schematic view of a wireless communication system for a flight vehicle, according to the various embodiments.

FIG. 1 is a partial schematic view of a wireless communication system 10 for a flight vehicle 12, according to the various embodiments. The system 10 includes a first stage 14 that is removably coupled to a second stage 16 by an inter-stage coupling 18. In general terms, the first stage 14 and the second stage 16 include propulsion systems, propellant storage and other associated devices (not shown in FIG. 1) that are operable to propulsively and sequentially accelerate the first stage 14 and the second stage 16 of the vehicle 12 during flight. The first stage 14 and the second stage 16 are configured to be separated while in flight (e.g., during a staging operation of the flight vehicle 12). Accordingly, the inter-stage coupling 18 may include a generally frangible structural member that may include various pyrotechnic devices that may be activated on command to separate the first stage 14 and the second stage 16. Although FIG. 1 only shows the first stage 14, the second stage 16, and the inter-stage coupling 18, it is understood that the flight vehicle 12 may include still other additional stages that are coupled by additional inter-stage couplings interposed between the additional stages, and may also include a payload section. Additionally, it is understood that the first stage 14 and the second stage 16 are not necessarily serially coupled, as shown in FIG. 1, but may also be coupled in a parallel arrangement (e.g., "side-by-side"), wherein the depicted first stage 14 and the second stage 16 may be ignited simultaneously, such as, for example, during an initial boost stage.

The first stage 14 may include a first electronics unit 20, and the second stage 16 may include a second electronics unit 22. The first electronics unit 20 and the second electronics unit 22 may, in general, include any electronic circuit or system that assists in the operation of the flight vehicle 12. For example, either (or both) of the first electronics unit 20 and the second electronics unit 22 may include circuits or systems related to a guidance system or a navigational device for the flight vehicle 12. In addition, the first electronics unit 20 and the second electronics unit 22 may also include still other circuits or systems related to propulsion systems in the respective first stage 14 and second stage 16, to sensor systems or devices in the first stage 14 and the second stage 16, or to circuits related to an in-flight separation system operably coupled to the inter-stage coupling 18.

The system 10 may also include a first transceiver 24 that is operably coupled to a first antenna 26 that is positioned in the first stage 14, and a second transceiver 28 that is operably coupled to a second antenna 30 positioned in the second stage 16. The first transceiver 24 and the second transceiver 28 may be configured to communicate signals with the first electronics unit 20 and the second electronics unit 22, respectively. The first transceiver 24 and first antenna 26, and the second transceiver 28 and the second antenna 30, will be discussed in greater detail below. The first transceiver 24 and the first antenna 26 may define a first wireless zone 32, while the second transceiver 28 and the second antenna 30 may define a second wireless zone 34. The first wireless zone 32 and the second wireless zone 34 are configured to exchange wireless signals 37 at least between the first stage 14 and the second stage 16. The first stage 14 may also include a power supply 36 that may be operably coupled to the first electronics unit 20 and the first transceiver 24 to provide electrical energy to the first electronics unit 20, the first transceiver 24, as well as other systems and circuits in the first stage 14 (not shown in FIG. 1). Correspondingly, the second stage 16 may also include a second power supply 38 that may be operably coupled to the second electronics unit 22, the second transceiver 28, and other systems and circuits in the second stage 16. The first power supply 36 and the second power supply 38 may include a storage battery capable of remote activation, such as a thermal battery that becomes operational upon the application of heat received from a heat source. Alternatively, the first power supply 36 and the second power supply 38 may also include rechargeable cells, or even fuel cells, although other known power sources may also be suitable.

A first umbilical 40 may be removably coupleable to the first stage 14, and a second umbilical 42 may also be removably coupleable to the second stage 16. The first umbilical 40 and the second umbilical 42 are generally configured to communicate electrical energy and/or information to the respective first stage 14 and second stage 16 before the flight vehicle 12 is launched, and decoupled from the flight vehicle 12 upon initiation of a launch procedure. Accordingly, the first umbilical 40 may be removably coupled to the first electronics unit 20 so that information, such as launch initiation information, guidance information, or other pertinent information may be communicated to the first electronics unit 20. The first umbilical 40 may also be removably coupled to the first power supply 36, so that electrical energy for battery initiation (e.g., to activate a thermal battery), or battery charging may be provided to the first power supply 36. Correspondingly, the second umbilical 42 may also be removably coupled to the second electronics unit 22 to communicate information to the second electronics unit 22, and to provide electrical energy to the second power supply 38.

Still referring to FIG. 1, the first transceiver 24 and the second transceiver 28 may be configured to operate in any one or more frequency bands generally selected from the ultra-high-frequency (UHF) portion, the super-high-frequency (SHF) portion, or the extremely-high-frequency (EHF) portion of the electromagnetic spectrum. Accordingly, the first transceiver 24 and the second transceiver 28 may be specifically configured to operate in one or more of the LS band (less than approximately 1 GHz), the L-band (approximately 1-2 GHz) the S-band (approximately 2-4 GHz), the C-band (approximately 4-8 GHz), the X-band (approximately 8-12 GHz), the Ku-band (approximately 12-18 GHz), the K-band (approximately 18.00-26.50 GHz) and the Ka-band (approximately 26.50-40.00 GHz), although other frequency bands may also be used. In some of the various embodiments, the first transceiver 24 and the second transceiver 28 are configured to operate in the L-band with a center frequency of approximately 1.8 GHz, and a bandwidth of approximately 500 MHz. In some of the various embodiments, the first transceiver 24 and the second transceiver 28 may be configured to encrypt the wireless signals 37 exchanged between the first transceiver 24 and the second transceiver 28 so that communication between the first wireless zone 32 and the second wireless zone 34 is resistant to jamming or interception. For example, the first transceiver 24 and the second transceiver 28 may be configured to communicate the wireless signals 37 using spread spectrum methods that may include frequency-hopping spread spectrum (FHSS), direct-sequence spread spectrum (DSSS), time-hopping spread spectrum (THSS), chirp spread spectrum (CSS), or suitable combinations of the foregoing methods. In some of the various embodiments, the first transceiver 24 and the second transceiver 28 may be configured to communicate digital data at a rate up to approximately 4.2 gigabits per second (Gbps) when operating frequencies greater than X-band (e.g., approximately 8-12 GHz) are used. In some of the various embodiments, a data rate of approximately 20 megabits per second (Mbps) may be used when the operating frequency is within the L-band (e.g., approximately 1-2 GHz).

The first antenna 26 and second antenna 30 may be configured to transmit and receive the wireless signals 37 in a selected operating band. In some of the various embodiments, the first antenna 26 and second antenna 30 may include a patch antenna. Briefly, and in general terms, a patch antenna includes at least one approximately planar radiating portion that is separated from a generally planar ground plane by a dielectric material. Accordingly, the at least one radiating portion, the dielectric material and the ground plane may be generally integrated into a flexible planar structure that may be applied directly to a surface, such as a selected surface portion of the first stage 14 and the second stage 16. In some of the various embodiments, the patch antenna may include at least one radiating portion (e.g., a driven element) that is coupled to an antenna feed point (e.g., to an output of one of the first transceiver 24 and the second transceiver 28) and may also include one or more passive reflector and director elements that cooperatively impart directivity to a radiation pattern from the patch antenna. Alternatively, the patch antenna may include a plurality of active elements that are excited in different phases, so that the patch antenna also achieves a predetermined radiation pattern. In either case, the first transceiver 24 and the second transceiver 28 may be coupled to the respective first antenna 26 and second antenna 30 by antenna matching networks (not shown in FIG. 1) and/or matching stubs, or other devices operable to match an impedance of the antenna to a feed point impedance. Alternatively, and also in accordance with the various embodiments, the first antenna 26 and second antenna 30 may include other antenna configurations, such as, for example, a monopole blade antenna configured to extend outwardly from a surface portion of the first stage 14 and the second stage 16.

Figure 2:
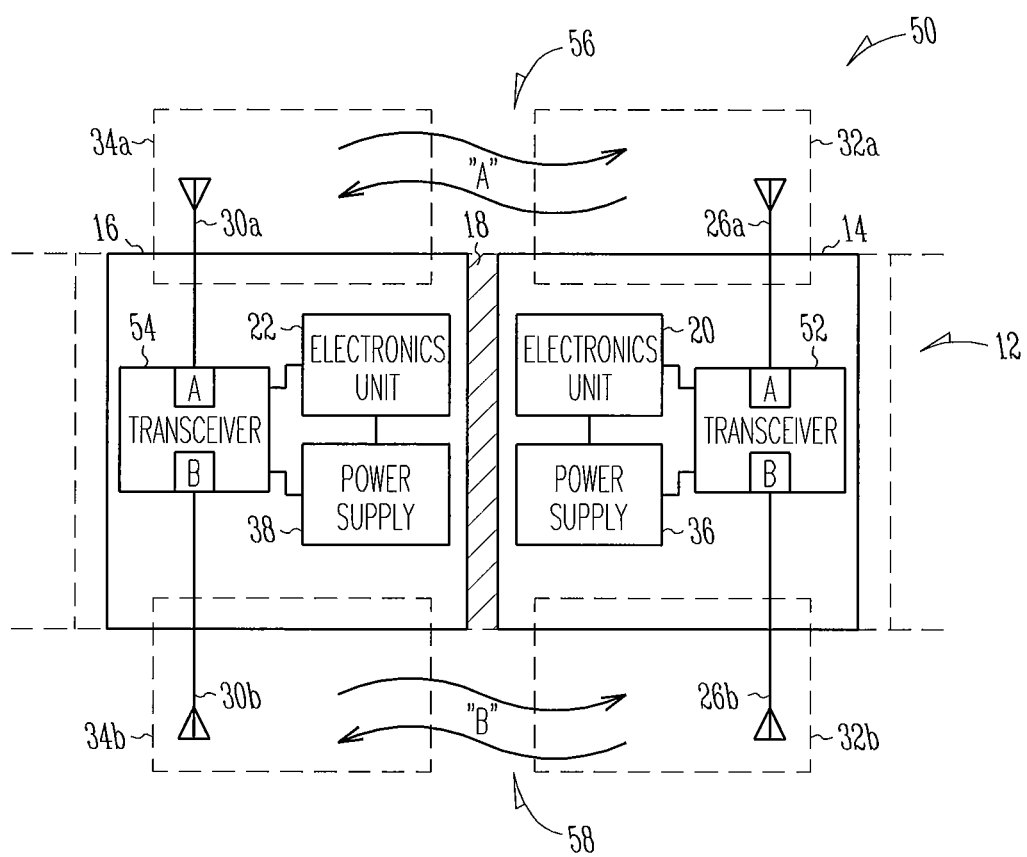
FIG. 2 is a partial schematic view of a wireless communication system for a flight vehicle, according to the various embodiments.

FIG. 2 is a partial schematic view of a wireless communication system 50 for a flight vehicle 12, according to the various embodiments. In the interest of brevity in the discussion that follows, various portions that have been discussed in detail previously may not be discussed further. The system 50 includes a first transceiver 52 positioned in the first stage 14, and a second transceiver 54 positioned in the second stage 16. The first transceiver 52 and the second transceiver 54 are configured to provide more than one communications channel. Accordingly, the first transceiver 52 and the second transceiver 54 may be configured to provide a first communications channel 56 (denoted by "A" in FIG. 2) between the first wireless zone 32a and a second wireless zone 34a, and a second communications channel 58 (denoted by "B" in FIG. 2) between a third wireless zone 32b and a fourth wireless zone 34b. To ensure that the first communications channel 56 and the second communications channel 58 are non-interfering, a first antenna 26a and a second antenna 30a may be suitably positioned on one portion of the first stage 14 and the second stage 16, while a third antenna 26b and a fourth antenna 30b may be positioned on another portion of the first stage 14 and the second stage 16. For example, the first antenna 26a and the second antenna 30a may be positioned on one side of the first stage 14 and the second stage 16, while the third antenna 26b and the fourth antenna 30b may be positioned on an opposing side of the first stage 14 and the second stage 16, although other physical arrangements of the first antenna 26a, the second antenna 30a, the third antenna 26b and the fourth antenna 30b are possible. Although two communications channels (e.g., the first communications channel 56 and the second communications channel 58) are shown in FIG. 2, it is understood that, in accordance with the various embodiments, more than two communications channels may be included.

With reference to FIG. 1 and FIG. 2, wireless communications between the first transceiver 24 and the second transceiver 28 (or the first transceiver 52 and second transceiver 54) eliminate the need for electrical inter-stage connectors between the first stage 14 and the second stage 16. Accordingly, the additional cost and weight associated with inter-stage connectors is avoided. Moreover, the need for external wiring ducts within stages of the flight vehicle 12 is also eliminated, thus avoiding the adverse effects on dynamics of the flight vehicle 12. Still other features of the various embodiments may be apparent to those skilled in the art.

Figure 3:
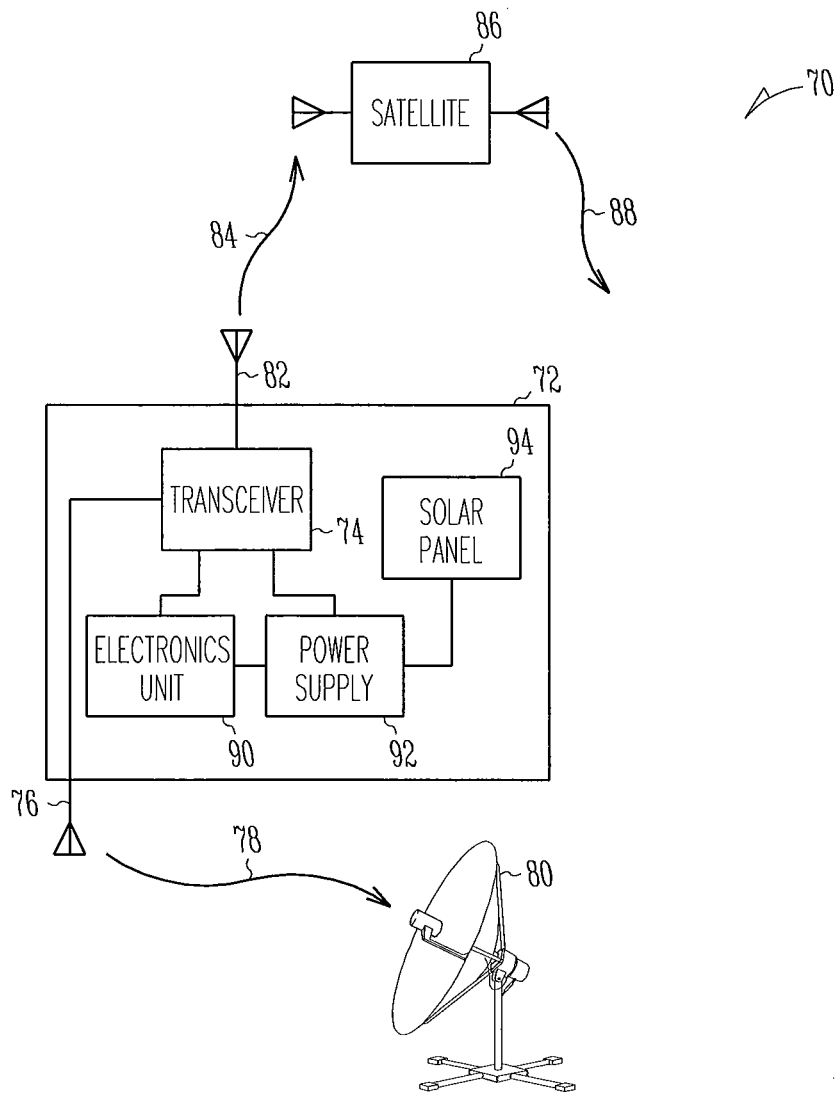
FIG. 3 is a partial schematic view of still another wireless communication system for a flight vehicle, according to the various embodiments.

FIG. 3 is a partial schematic view of still another wireless communication system 70 for a flight vehicle 72, according to the various embodiments. The flight vehicle 72 may include a post-separation portion of a multi-stage vehicle, such as one of the first stage 14 or the second stage 16 shown in FIG. 1 and FIG. 2, that may be following an orbital or sub-orbital flight path. The communication system 70 may include a transceiver 74 that may be operably coupled to a first antenna 76 configured to communicate signals 78 to a ground station 80. The transceiver 74 may also be operably coupled to a second antenna 82 configured to communicate signals 84 to a satellite 86, which may further transfer signals 88 to the ground station 80, or to other receiving stations. The transceiver 74 may be coupled to the first antenna 76 and the second antenna 82 through a Wilkinson power divider (not shown in FIG. 3), for example, to divide the output power applied by the transceiver 74 to the first antenna 76 and the second antenna 82. The first antenna 76 and the second antenna 82 may also include antenna structures configured to achieve a circularly-polarized radiation pattern to generally assist communications between the transceiver 74 and the ground station 80 and/or the satellite 86.

The transceiver 74 may be coupled to an electronics unit 90 that may be configured to provide an identifier to the transceiver 74, which may be further encoded in at least one of the signals 78 and the signals 84 communicated to the ground station 80 and the satellite 86, respectively. The identifier may include, for example, at least one of an identification of the flight vehicle 72, a launch date of the flight vehicle 72, an altitude or position of the flight vehicle 72, or other pertinent information that may be useful in tracking the post-launch position and identity of the flight vehicle 72.

The communications system 70 may also include a power supply 92 to provide electrical energy to the transceiver 74 and the electronics unit 90. The power supply 92 may include a thermal battery, as discussed in detail above, but may also include a rechargeable battery that may be coupled to an electrical source, such as a photovoltaic (e.g., solar) panel 94, so that the endurance of the communications system 70 may be extended beyond that typically available from the thermal battery alone.

Referring still to FIG. 3, the communications system 70 provides communications between the transceiver 74 and at least one of the ground station 80 and the satellite 86 so that the flight vehicle 72 may be positively identified while the flight vehicle 72 is following an orbital or a sub-orbital path. Since the identifier, which may be encoded in the signals 78 and/or the signals 84, may include identification of the flight vehicle 72, the orbital or sub-orbital path of the flight vehicle 72 may be more conveniently monitored.

Figure 4:
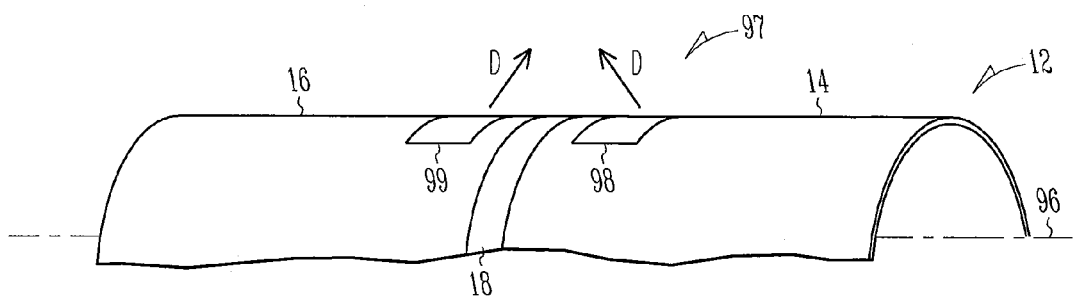
FIG. 4 is a partial isometric view of an antenna installation for a flight vehicle, according to the various embodiments.

FIG. 4 is a partial isometric view of an antenna installation 97 for the flight vehicle 12, according to the various embodiments. The installation 97 includes a first patch antenna 98 positioned on the first stage 14, and a second patch antenna 99 positioned on the second stage 16. The first patch antenna 98 and the second patch antenna 99 may be positioned proximate to an interface between the first stage 14 and the second stage 16, such as proximate to the inter-stage coupling 18. The first patch antenna 98 and the second patch antenna 99 may be configured to provide a directional radiation pattern "D" that is approximately aligned with a longitudinal axis 96 of the flight vehicle 12, so that close longitudinal coupling between the first patch antenna 98 and the second patch antenna 99 may be achieved. The first patch antenna 98 and the second patch antenna 99 may include a directional array (e.g., an array having a driven element and one or more closely-coupled reflector or director elements) to achieve the directional radiation pattern "D", or the first patch antenna 98 and the second patch antennal 99 may include a phase-driven array, having different active portions that may be subject to excitation by different phases that are derived from a primary excitation signal.

Figure 5:
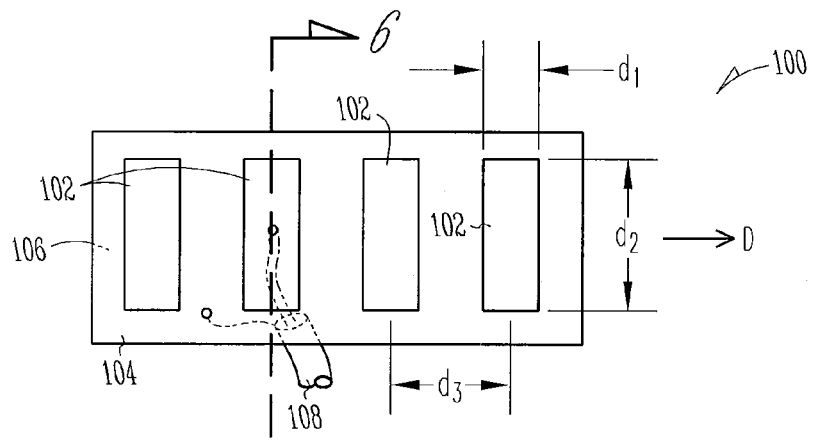
FIG. 5 is a plan view of a patch antenna, according to the various embodiments.

FIG. 5 is a plan view of a patch antenna 100, according to the various embodiments. The patch antenna 100 may include one or more conductive portions 102 positioned on a dielectric substrate 104. A conductive ground plane layer 106 may substantially underlie the conductive portions 102 and the dielectric substrate 104, as shown in greater detail in FIG. 6. The dielectric substrate 104 may include a variety of flexible polymeric or elastomeric materials, and the one or more conductive portions 102 and the ground plane layer 106 may include relatively thin layers of metallic foils, so that the patch antenna 100 may be conveniently applied to curved surfaces. Alternatively, the patch antenna 100 may be fabricated from a relatively rigid composite and dielectric material having the conductive portions 102 and the conductive ground plane layer 106 electrodeposited or cladded to opposing sides of the rigid composite material. One suitable material having conductive foil cladded onto opposing sides is Rogers RT/DUROID 5870, available from the Rogers Corporation of Chandler, Ariz., although other suitable alternatives exist. A transmission line 108, such as a coaxial transmission line, may be operably coupled to the one or more conductive portions 102, and also operably coupled to the ground plane layer 106. Although FIG. 5 shows a single transmission line 108 coupled to a single conductive portion 102, it is understood that other transmission lines 108 may be coupled to other conductive portions 102 and to the ground plane layer 106.

According to the various embodiments, the one or more conductive portions 102 may be approximately rectangular, and may be spaced apart by approximately one-half wavelength (relative to free space), and the conductive portions 102 may extend approximately one-half wavelength (relative to the material comprising the dielectric substrate 104). In some of the various embodiments, the conductive portions 102 have dimensions of $d_1$ approximately equal to 0.2 inch, and $d_2$ approximately equal to 0.25 inch, and are spaced apart on the dielectric substrate 104 by a distance $d_3$ approximately equal to 0.3 inch, although other dimensions may be used, and depend upon the selected operating frequency.

Figure 6:
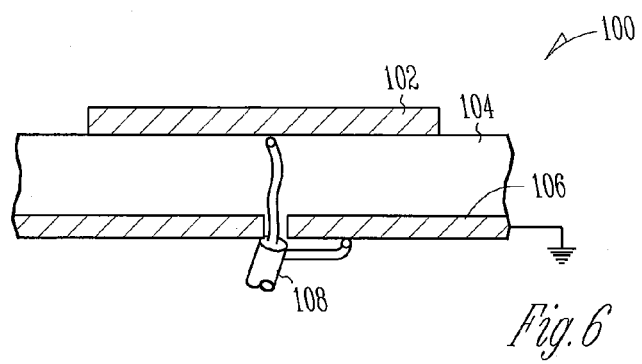
FIG. 6 is a partial cross-sectional view of the patch antenna of FIG. 5.

With continued reference to FIG. 5 and FIG. 6, the conductive portions 102 may be operably coupled to individual transmission lines 108, with a selected phase offset applied to the conductive portions 102. In one of the various embodiments, the conductive portions 102 may be subjected to a phase offset of approximately 180 degrees, although other phase offset values may also be used.

Figure 7:
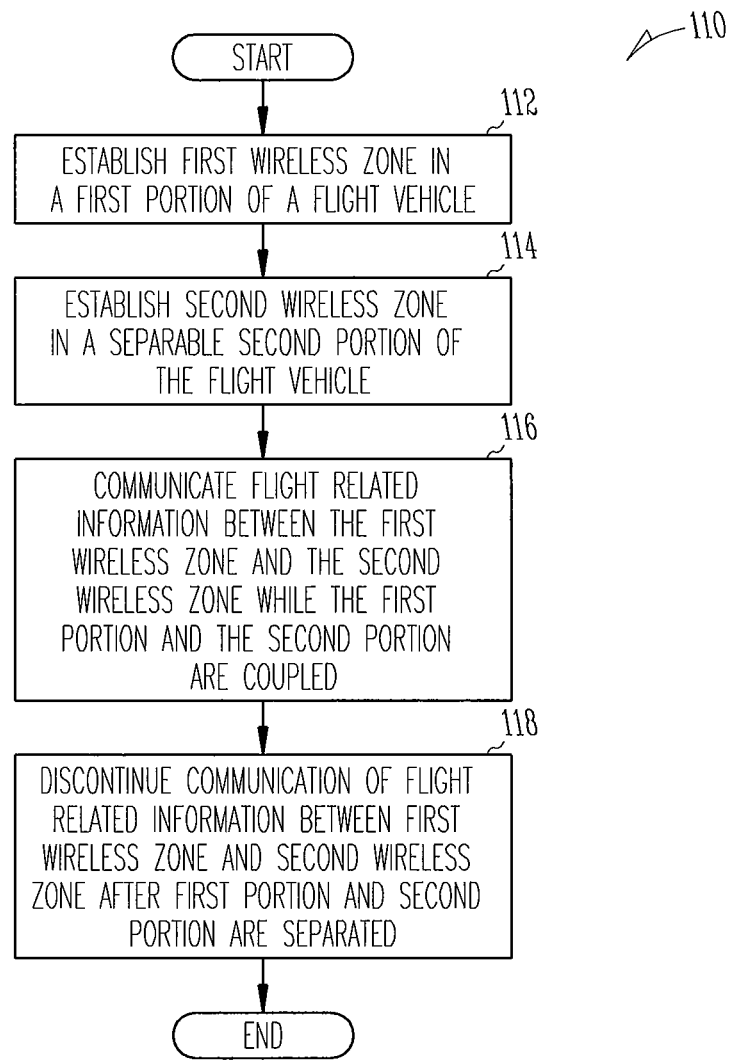
FIG. 7 is a flowchart that will be used to describe a method of wireless communication in a flight vehicle, according to the various embodiments.

FIG. 7 is a flowchart that will be used to describe a method 110 of wireless communication in a flight vehicle, according to the various embodiments. At block 112, a first wireless zone may be established in a first portion of the flight vehicle. At block 114, a second wireless zone is established in a second portion of the flight vehicle, where the second portion is separably coupled to the first portion. At block 116, flight-related information may be communicated between the first flight portion and the second flight portion while the first portion and the second portion are coupled. At block 118, the communication of flight-related information may be discontinued after the first portion is separated from the second portion.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless communication system for a flight vehicle, comprising:
    a first portion configured to generate a first wireless zone; and
    a second portion configured to be structurally decoupled from the first portion and configured to generate a second wireless zone, wherein the first wireless zone and the second wireless zone are configured to communicate flight-related information between the first portion and the second portion while the first portion and the second portion are coupled, and to discontinue the communication of flight-related information between the first portion and the second portion subsequent to the separation of the first portion from the second portion.

2. The wireless communication system of claim 1, wherein the first portion includes a first transceiver coupled to a first antenna positioned on the first portion, and the second portion includes a second transceiver coupled to a second antenna positioned on the second portion, wherein the first antenna is proximate to the second antenna.

3. The wireless communication system of claim 2, wherein the first transceiver is coupled to a first electronics unit, and the second transceiver is coupled to a second electronics unit, wherein at least one of the first electronics unit and the second electronics unit are configured to communicate the flight-related information to the respective first transceiver and the second transceiver.

4. The wireless communication system of claim 2, wherein the first transceiver and the second transceiver are configured to communicate using more than one communications channel.

5. The wireless communication system of claim 1, wherein the flight-related information includes at least one of flight guidance information for the flight vehicle, navigation information for the flight vehicle, propulsion system information for the flight vehicle, sensor information for the flight vehicle and in-flight separation information for the flight vehicle.

6. The wireless communication system of claim 2, wherein at least one of the first antenna and the second antenna includes a patch antenna configured to be positioned on an exterior of the first portion or an exterior of the second portion.

7. The wireless communication system of claim 2, wherein the first transceiver and the second transceiver are configured to operate in one of the ultra-high-frequency (UHF) portion, the super-high-frequency (SHF) portion, or the extremely-high-frequency (EHF) portion of the electromagnetic spectrum.

8. The wireless communication system of claim 2, wherein the first transceiver and the second transceiver are configured to communicate the flight-related information using spread spectrum methods, including at least one of frequency-hopping spread spectrum (FHSS), direct-sequence spread spectrum (DSSS), time-hopping spread spectrum (THSS), and chirp spread spectrum (CSS).

9. The wireless communication system of claim 6, wherein the patch antenna includes a directional array configured to be positioned on the exterior of the first portion or the second portion.

10. The wireless communication system of claim 9, wherein the patch antenna includes a phase-driven directional array.

11. The wireless communication system of claim 2, wherein the first portion comprises a first stage of a multi-stage flight vehicle, the second portion comprises a second stage of the multi-stage flight vehicle, and the first stage and the second stage are coupled by an inter-stage coupling configured to decouple the first stage and the second stage upon activation, further wherein the first antenna and the second antenna are proximate to the inter-stage coupling.

12. A wireless communication system for a multi-staged flight vehicle, comprising:
a first stage including a first transceiver; and
a second stage configured to be coupled to the first stage during a first flight portion, and decoupled from the first stage during a second flight portion, the second stage including a second transceiver configured to wirelessly communicate with the first transceiver, wherein the first transceiver and the second transceiver wirelessly communicate flight-related information between the first stage and the second stage during the first flight portion, and discontinue wireless communication of the flight-related information between the first stage and the second stage during the second flight portion.

13. The wireless communication system of claim 12, wherein the first transceiver and the second transceiver are configured to communicate using more than one communications channel.

14. The wireless communication system of claim 12, comprising a first electronics unit coupled to the first transceiver and a second electronics unit coupled to the second transceiver, wherein at least one of the first electronics unit and the second electronics unit are configured to communicate at least one of flight guidance information, navigation information, propulsion system information, sensor information and in-flight separation information for the multi-stage flight vehicle to at least one of the first transceiver and the second transceiver.

15. The wireless communication system of claim 14, wherein the first transceiver and the first electronics unit are coupled to a first power supply, and the second transceiver and the second electronics unit are coupled to a second power supply, wherein at least one of the first power supply and the second power supply include at least one of a thermal battery power source, a fuel cell power source and a photovoltaic power source.

16. The wireless communication system of claim 15, wherein at least one of the first transceiver and the first electronics unit is configured to be removably coupled to a first umbilical, and at least one of the second transceiver and the second electronics unit is configured to be removably coupled to a second umbilical, wherein the first umbilical and the second umbilical are configured to be decoupled prior to the first flight portion of the multi-stage flight vehicle.

17. A method of wireless communication in a flight vehicle, comprising:
establishing a first wireless zone in a first portion of a flight vehicle;
establishing a second wireless zone in a second portion of the flight vehicle, the first portion configured to be structurally decoupled from the second portion of the flight vehicle;
communicating flight-related information between the first wireless zone and the second wireless zone while the first portion and the second portion of the flight vehicle are structurally coupled; and
discontinuing the communication of flight-related information between the first portion and the second portion of the flight vehicle subsequent to structurally decoupling the first portion of the flight vehicle from the second portion of the flight vehicle.

18. The method of claim 17, wherein communicating flight-related information between the first wireless zone and the second wireless zone comprises communicating the flight-related information using more than one communications channel.

19. The method of claim 17, comprising communicating at least a portion of the flight-related information from one of the first portion and the second portion to one of a ground receiving station and a satellite subsequent to structurally decoupling the first portion of the flight vehicle from the second portion of the flight vehicle.

20. The method of claim 17, wherein communicating flight-related information between the first wireless zone and the second wireless zone comprises encrypting the flight-related information prior to communicating the flight-related information between the first wireless zone and the second wireless zone.

* * * * *